United States Patent
Scott et al.

(10) Patent No.: US 11,014,661 B2
(45) Date of Patent: May 25, 2021

(54) TIP JET ORIFICE FOR AIRCRAFT BROWN OUT MITIGATION

(71) Applicant: Sikorsky Aircraft Corporation, Stratford, CT (US)

(72) Inventors: Mark W. Scott, Bethany, CT (US); Daniel Caleb Sargent, Easton, CT (US)

(73) Assignee: SIKORSKY AIRCRAFT CORPORATION, Stratford, CT (US)

(*) Notice: Subject to any disclaimer, the term of this patent is extended or adjusted under 35 U.S.C. 154(b) by 559 days.

(21) Appl. No.: 15/332,498

(22) Filed: Oct. 24, 2016

(65) Prior Publication Data

US 2018/0111677 A1    Apr. 26, 2018

(51) Int. Cl.
*B64C 23/00* (2006.01)
*B64C 27/473* (2006.01)
*B64C 21/02* (2006.01)

(52) U.S. Cl.
CPC .......... *B64C 27/473* (2013.01); *B64C 21/025* (2013.01); *B64C 2230/28* (2013.01)

(58) Field of Classification Search
CPC ... B64C 23/005; B64C 27/473; B64C 27/467; B64C 27/46; B64C 27/18; B64C 27/72; B64C 21/04; B64C 21/05; B64C 21/08; B64C 2027/725; B64C 2027/7227; B64C 23/06; B64C 27/463; B64C 11/18; F03D 7/0296; F03D 7/022; F03D 7/0675; F15D 1/12; F01D 5/02; F01D 5/00
See application file for complete search history.

(56) References Cited

U.S. PATENT DOCUMENTS

| | | | | |
|---|---|---|---|---|
| 3,713,750 A | * | 1/1973 | Williams | B64C 27/325 416/20 R |
| 4,655,685 A | * | 4/1987 | Fradenburgh | B64C 27/325 416/24 |
| 5,562,414 A | * | 10/1996 | Azuma | B64C 23/06 244/1 N |
| 5,791,875 A | | 8/1998 | Ngo | |
| 6,948,906 B2 | * | 9/2005 | Leishman | B64C 21/02 415/119 |
| 9,139,297 B1 | * | 9/2015 | White | B64D 31/04 |

(Continued)

OTHER PUBLICATIONS

Kuerbitz et al.; "Investigation of Centrifugal Pumping Rotor Blades as a Means of Vortex Diffusion", 71st Annual Forum of the American Helicopter Society, Virginia Beach, VA May 5-7, 2015, pp. 1-18.

(Continued)

*Primary Examiner* — Medhat Badawi
*Assistant Examiner* — Vicente Rodriguez
(74) *Attorney, Agent, or Firm* — Foley & Lardner LLP

(57) ABSTRACT

A rotor blade for a rotary aircraft is disclosed. The rotor blade includes a body and an airflow duct extending within the body of the rotor blade. An airflow outlet of the airflow duct is located at a tip of the blade. The airflow outlet has a cross-sectional area that is equal to or greater than a cross-sectional area of the airflow duct. The rotor blade is used to mitigate brownout during flight. Air exits the rotor blade at the airflow outlet in order to disrupt a blade vortex created by rotation of the rotor blade.

12 Claims, 2 Drawing Sheets

(56) References Cited

U.S. PATENT DOCUMENTS

| | | | | |
|---|---|---|---|---|
| 2007/0252047 | A1* | 11/2007 | Pal | B64C 27/001 244/35 R |
| 2011/0206507 | A1* | 8/2011 | Bhaisora | F03D 1/0633 416/1 |
| 2013/0224017 | A1* | 8/2013 | Scott | B64C 27/325 416/1 |
| 2017/0029102 | A1* | 2/2017 | Clingman | B64C 21/04 |
| 2017/0174339 | A1* | 6/2017 | Leusink | B64C 27/463 |
| 2018/0281938 | A1* | 10/2018 | Scott | B64C 27/18 |

OTHER PUBLICATIONS

Kuerbitz; A Trident Scholar Project Report, No. 438, "An Examination of a Pumping Rotor Blade Design for Brownout Mitigation", United States Naval Academy, Anapolis, Maryland, May 18, 2015, pp. 1-79.

Leishman; MURI 08 "Rotocraft Brownout Advanced Understanding, Control, and Mitigation", Final Report, Oct. 31, 2014, pp. 1-157.

Milluzzo, III et al.; "Exit-Slot Orientation on Pumping Blades for a Rotor in Ground Effect", Journal of Aircraft, Presented as Paper 2015 at the Annual Forum of the American Helicopter Society, Virginia Beach, VA May 5-7, 2015, Article in Advance, pp. 1-14.

Syal et al.; "On the Possibilities of Brownout Mitigation Using a Slotted-Tip Rotor Blade", 29th AIAA Applied Aerodynamics Conference, Jun. 27-30, 2011, Honolulu, Hawaii, pp. 1-22.

\* cited by examiner

TIP JET ORIFICE FOR AIRCRAFT BROWN OUT MITIGATION

BACKGROUND OF THE INVENTION

The present invention is directed to improving a method of mitigating the occurrence of brownout during flight operations of a rotary wing aircraft and, in particular, to a method of reducing the strength of blade vortices that entrain sand and dust particles and lead to brownout. Brownout occurs when dust or sand is kicked into the air by helicopter rotor downwash, most often during landing, near ground taxi and take-off operations. A brownout can cause lack of visibility, which makes the landing and/or take-off difficult or impossible. Additionally, a brownout can blow particles into aircraft engines and mechanical parts, reducing the life of critical flight hardware. Blade design has been useful in affecting other aspects of flight such as noise reduction, etc. Accordingly, it is desirable to provide a blade having a design suitable for mitigating brownout.

SUMMARY OF THE INVENTION

According to one embodiment of the present invention, a method of mitigating brownout during flight of a rotary wing aircraft, including: rotating a rotor blade of the aircraft to create a blade vortex that produces brownout; and flowing air through an airflow duct within the rotating rotor blade to exit at an airflow outlet in order to disrupt the blade vortex, wherein a cross-sectional area of the airflow outlet is equal to or greater than a cross-sectional area of the airflow duct.

According to another embodiment of the present invention, a rotor blade for a rotary aircraft, including: a body of the rotor blade; an airflow duct extending within the body of the rotor blade; and an airflow outlet of the airflow duct at a tip of the blade, the airflow outlet having a cross-sectional area that is equal to or greater than a cross-sectional area of the airflow duct.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
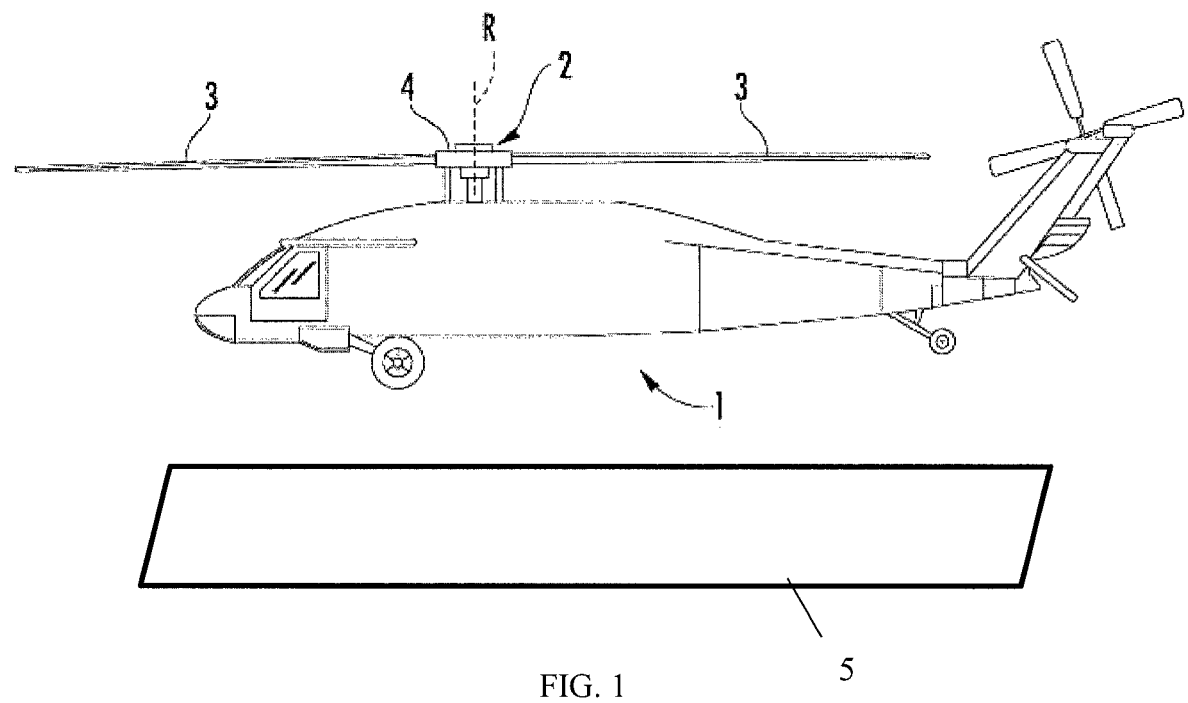
FIG. 1 illustrates one embodiment of the present disclosure, in which a rotary wing aircraft employs a rotor system.

Referring now to the Figures, where the invention will be described with reference to specific embodiments, without limiting same, FIG. 1 illustrates one embodiment of the present disclosure, in which a rotary wing aircraft 1 employs a rotor system 2. The rotor system 2 includes a plurality of rotor blades 3 arranged to rotate about a central hub 4, and rotational axis R. The rotary wing aircraft 1 may be a helicopter, as shown, or may be any other aircraft that employs a rotary propulsor such as an airplane or high speed vertical take-off and landing (VTOL) aircraft. The rotor system 2 is depicted in use with a rotary aircraft, but may also be employed in a number of useful applications, wind turbines, maritime propellers and other devices that typically use rotor systems. Further, while shown in the context of a single rotor aircraft, it is understood that aspects can be used in coaxial contra-rotating aircraft, fixed wing aircraft, and other types of aircraft. Further, although embodiments are described with reference to main rotor blades, embodiments are also applicable to tail rotor blades, propeller blades, etc.

The aircraft 1 is shown in a near-surface flight condition, such as a take-off or landing flight conditions. When flying close to surface 5, air currents and/or air vortices produced by rotation of the rotor blade 3 causes particulate matter at the surface 5 to be kicked up into the air, causing a brownout. The blade described herein with respect to FIGS. 2 and 3 can be used during landing and take-off or other near-surface flight conditions to mitigate the effects of brownout.

Figure 2:
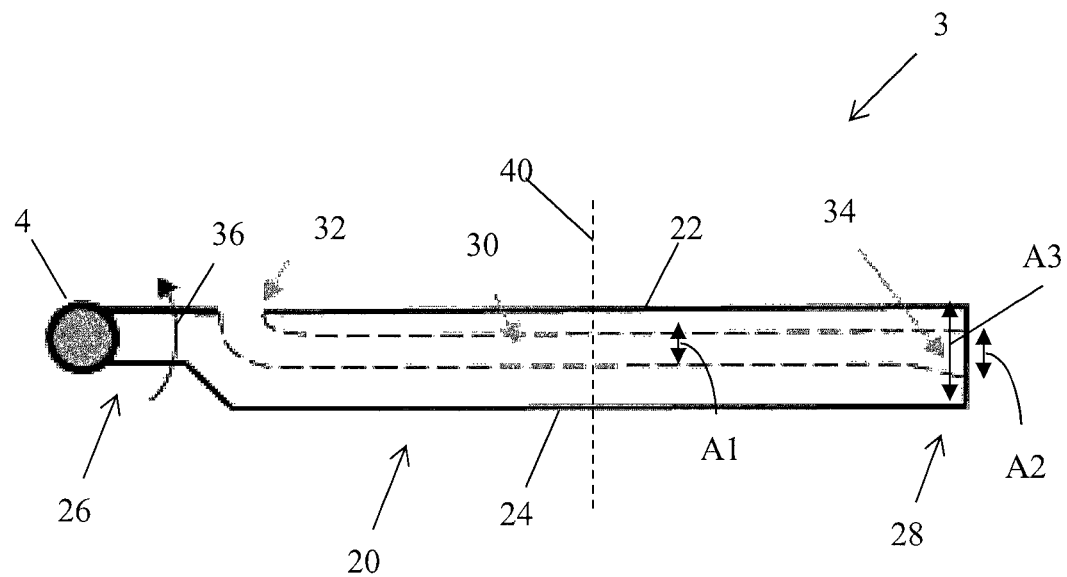
FIG. 2 shows details of a rotor blade for use in the rotor system of the present disclosure.

FIG. 2 shows details of rotor blade 3 for use in the rotor system 2 of the present disclosure and as described above. The rotor blade 3 includes an elongated body 20 having a leading edge 22 and a trailing edge 24. A root end 26 of the elongated body 20 is configured to be attached to the central hub 4. A tip 28 of the elongated body 20 is located furthest from the central hub 4. The tip 28 and root end 26 are separated from each other along a radial line of the rotor blade 3. The rotor blade 3 contains an airflow duct 30 that runs internally through the elongated body 20 and along the radial line. The airflow duct 30 connects to an airflow inlet 32, located at or near the root end 26, and an airflow outlet 34 located at or near the tip 28. As shown in FIG. 2, the airflow inlet 32 is located near the root end 26 of the elongated body 20, along the leading edge 22. It is to be understood however that the airflow inlet 32 can be located anywhere along the blade 3, including at the trailing edge 24 or the upper or lower surfaces of the elongated body 20, and that a plurality of inlets can be used in combinations of these configurations.

The flow of air into the airflow duct 30 is created by rotation 36 of the blade 3, which sucks air into the airflow inlet 32. The air flows from the inner radius of the rotor system 2 to the outer radius of the rotor system 2 due to the centrifugal force acting on the air within the airflow duct 30. The air then is ejected radially from the airflow duct 30 via airflow outlet 34 at the tip 28 of the blade 3. The faster the rotation of the rotor blade 3 and the farther the airflow outlet 34 is from the center of rotation, the greater the velocity at which air exits the airflow outlet 34. Additional airflow can be provided using a mechanical device, such as a pump, in addition to centrifugal force to create airflow.

The airflow outlet 34 is designed for increasing and/or maximizing flow velocity and/or mass flow for the rotor blade 3 during rotation of the rotor blade 3. A cross-section is indicated for rotor blade 3 by drawing a plane 40 perpendicular to the radial line of the blade 3. The cross-sectional area of the blade 3 is approximately the same for radial locations of the plane 40 between the airflow inlet 32 and the airflow outlet 34. The cross-sectional area of the airflow duct 30 between the airflow inlet 32 and the airflow outlet 34, as defined by plane 40, is indicated by A1. A cross-sectional area A2 for the airflow outlet 34 is defined by a plane parallel to plane 40 at the tip 28. The cross-sectional area A1 of the airflow duct 30 relative to the blade cross-sectional area is substantially the same along the length of the blade 3. In some embodiments, the cross-sectional area A2 of the airflow outlet 34 is greater than the cross-sectional area A1 along the airflow duct 30. In other embodiments, the cross-sectional area A2 is the same as cross-sectional area A1, but shaped to accelerate the air as it exits the tip 28. The cross-sectional area A2 may be greater than about 50% of the cross-sectional area A3 of the tip 28 in one embodiment. In another embodiment, the cross-sectional area A2 is greater than about 75% of the cross-section area A3 of the tip 28. Additionally, there are no obstructions or restrictions of the airflow duct 30 at the airflow outlet 34. While shown with a cross sectional area A3 of the tip 28 substantially the same as the cross section area of remainder of the blade 3, it is understood that other aspects of the invention can include swept or anhedral tip shapes, and that the cross sectional area A3 can be less than the cross sectional area of the remainder of the blade 3.

By having cross-sectional area A2 being equal to or greater than cross-sectional area A1 and not having any obstructions or restrictions at the airflow outlet 34, the air exits the tip 28 of the rotor blade 3 with a greater velocity than would be possible with if either cross-sectional area A2 were less than cross-sectional area A1 or the airflow outlet 34 included obstructions or restrictions, such as a plurality of small nozzles. The shape of cross-sectional area A2 may be different than the shape of cross-sectional area A1. However, the airflow outlet 34 is a continuous orifice (i.e., the shape of the cross-sectional area is entirely contiguous and does not include gratings, choke points, flow restrictions or other manufacture obstructions). The airflow duct 30 therefore produces as much mass flow as possible for the selected cross-sectional area A1. The mass flow of air is ejected radially outward from the tip 28. The air flow ejected from the tip 28 disrupts and/or weakens the tip vortex diffusion, thereby mitigating brownout conditions.

The rotor blade 3 of FIG. 2 therefore includes a single large orifice at the blade tip 28, having a cross-sectional area A2 greater than or equal to a cross-sectional area of the airflow duct A1. This orifice reduces losses and therefore maximizes flow velocity and mass flow at the blade tip. As mass flow is a function of the cross-sectional area of the airflow inlet 32, the cross-sectional area of the airflow outlet 34 is as large as possible up to the cross-sectional area of the airflow inlet 32.

Figure 3:
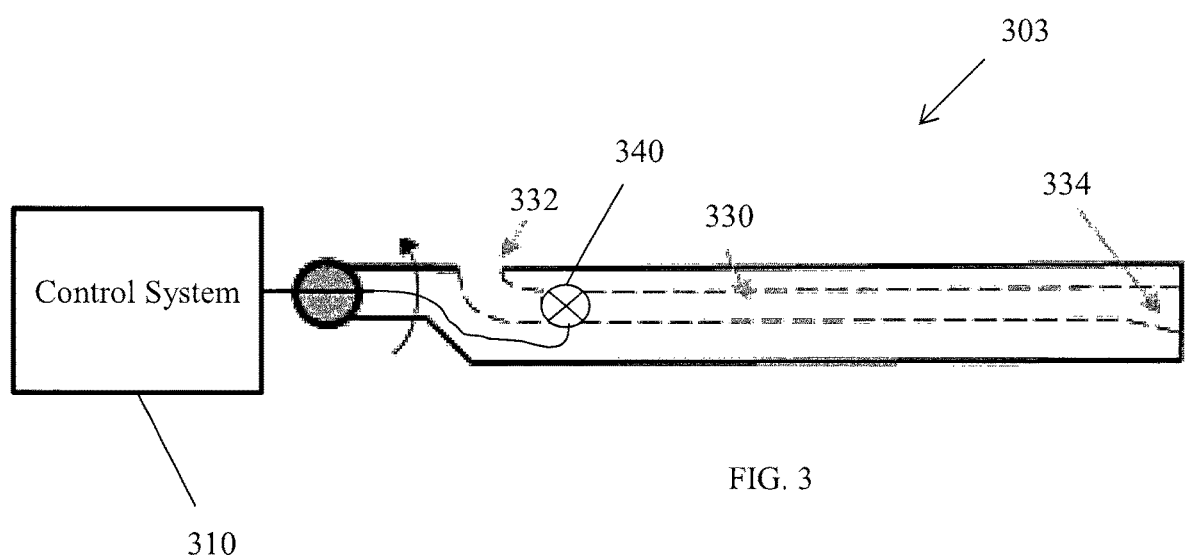
FIG. 3 shows a rotor blade having an internal airflow duct and a flow modulator within the airflow duct.

FIG. 3 shows a rotor blade 303 having an internal airflow duct 330 having a flow modulator 340 within the airflow duct 330. Flow modulation maintains blowing effectiveness for airfoil flow control while using a fraction of the mass flow required for continuous blowing. By modulating tip jet flow, less rotor power is required, which increases aircraft efficiency. The airflow duct 330 includes airflow inlet 332 and airflow outlet 334. The flow modulator 340 can operate to produce steady airflow or unsteady airflow. The flow modulator 340 is shown near the proximal end 8. However, the flow modulator 40 can be located anywhere in the airflow duct 330. In other embodiments, the flow modulator 340 can be disposed off of the rotor blade 303, such as on the aircraft 1 or hub assembly 4 and can feed modulated air into the airflow inlet 332. The flow modulator 340 can be an electric, mechanical, or pneumatic valve and can include a controller which modulates the flow of the air. The flow modulator 340 achieves a specific flow rate schedule versus time through the airflow duct 330. In various embodiments, the flow modulator 340 can produce an oscillating airflow. A maximum of the oscillating airflow can be controlled to correspond to a selected rotational angle of the rotor blade 303. The flow modulator 340 can be turned on or opened when the aircraft 1 is flying near a surface 5 that has particulate matter and can be turned off or closed when the aircraft is away from the surface 5.

A control system 310 is coupled to the flow modulator 340 and control the operation of the flow modulator 340 in order to mitigate brownout. The control system 310 opens the flow modulator 340 when the aircraft 1 is at a distance from a surface that is at or less than a selected distance from the surface. In various embodiments, the selected distance is about a length of a rotor blade. The opened flow modulator 304 allows flow of air through the airflow duct 330 and out of the rotor blade at the blade tip and therefore mitigates brownout, especially for a surface that includes particulate matter. When the aircraft is above the surface at a distance that is greater than the selected distance, the control system 310 closes the flow modulator 340 since there are few if any brownout effects at this distance.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A method of mitigating brownout during flight of a rotary wing aircraft, comprising:
    rotating a rotor blade of the aircraft to create a blade vortex that produces brownout;
    injecting air into an airflow inlet along a leading edge of the rotor blade via rotation of the rotor blade;
    flowing the air through an airflow duct within the rotating rotor blade to exit at an airflow outlet not having any obstructions or restrictions therein in order to disrupt the blade vortex, wherein a cross-sectional area of the airflow outlet is greater than a cross-sectional area of the airflow duct;
    opening a flow modulator when the rotary wing aircraft is a first distance from a first surface, the first distance less than or equal to a length of the rotor blade; and
    closing the flow modulator when the rotary wing aircraft is a second distance from the first surface, the second distance greater than the length of the rotor blade.

2. The method of claim 1, further comprising ejecting the air radially from the airflow outlet at a tip of the rotor blade.

3. The method of claim 1, wherein the airflow inlet is at a root of the rotor blade.

4. The method of claim 1, wherein the cross-sectional area of the airflow duct is defined by a plane perpendicular to a radial line of the rotor blade at a location between the airflow inlet and the airflow outlet.

5. The method of claim 1, wherein a shape of the cross-sectional area of the airflow duct is different than a shape of the cross-sectional area of the airflow outlet.

6. The method of claim 1, wherein the airflow outlet includes a single outlet not having any obstructions or restrictions therein at the tip of the rotor blade and a cross-sectional area of the airflow outlet is greater than at least one of: (i) 50% of a cross-sectional area of the tip; or (ii) 75% of the cross-sectional area of the tip.

7. The method of claim 1, further comprising controlling an airflow rate in the airflow duct with the flow modulator.

8. A rotor blade for a rotary aircraft, comprising:
a body of the rotor blade;
an airflow inlet along a leading edge of the rotor blade;
an airflow duct extending within the body of the rotor blade;
an airflow outlet of the airflow duct at a tip of the rotor blade, the airflow outlet not having any obstructions or restrictions therein and having a cross-sectional area that is greater than a cross sectional area of the airflow duct; and
a flow modulator operably coupled to the airflow duct, wherein the flow modulator is configured to:
 open the airflow duct when the aircraft is a first distance from a surface, the first distance less than or equal to a length of the rotor blade; and
 close the airflow duct when the aircraft is a second distance from the surface, the second distance greater than the length of the rotor blade.

9. The rotor blade of claim 8, wherein the airflow inlet is at a root of the rotor blade.

10. The rotor blade of claim 8, wherein the cross-sectional area of the airflow is at least one of: (i) about 50% of a cross-sectional area of the tip of the rotor blade; or (ii) about 75% of the cross-section area of the tip of the rotor blade.

11. The rotor blade of claim 8, wherein the flow modulator is disposed within the airflow duct.

12. The rotor blade of claim 11, further comprising a control system coupled to the flow modulator for controlling the flow modulator.

\* \* \* \* \*